United States Patent
Hegg et al.

Patent Number: 5,291,113
Date of Patent: Mar. 1, 1994

[54] SERVO COUPLED HAND CONTROLLERS

[75] Inventors: Jeffrey W. Hegg, North Redington Beach; Wayne E. Lance, Largo, both of Fla.

[73] Assignee: Honeywell Inc., Minneapolis, Minn.

[21] Appl. No.: 957,216

[22] Filed: Oct. 6, 1992

[51] Int. Cl.$^5$ .............. B64C 13/18; G05D 1/08
[52] U.S. Cl. .................. 318/584; 318/568.16; 244/135 A; 244/234; 244/220
[58] Field of Search .................. 318/568.16, 584; 244/135 A, 234, 220; 74/471 XY

[56] References Cited

U.S. PATENT DOCUMENTS

| | | | |
|---|---|---|---|
| 3,270,260 | 8/1966 | Mehr | 317/255 |
| 4,150,803 | 4/1979 | Fernandez | 244/135 A |
| 4,865,277 | 9/1989 | Smith et al. | 244/234 |
| 4,894,598 | 1/1990 | Daggett | 318/568.16 |
| 4,906,907 | 3/1990 | Tsuchihashi et al. | 318/568.22 X |
| 5,047,701 | 9/1991 | Takarada et al. | 318/568.1 |
| 5,137,234 | 8/1992 | Sakurai | 244/234 |
| 5,188,316 | 2/1993 | Dressler et al. | 244/234 |

*Primary Examiner*—William M. Shoop, Jr.
*Assistant Examiner*—Karen Masih
*Attorney, Agent, or Firm*—A. J. Cortina; A. Medved

[57] ABSTRACT

A servo controlled system is provided for electrically coupling the motions and applied forces of pilot and co-pilot control sticks. Servo-coupling between the two control sticks is accomplished by detecting the position of the control sticks of respective controllers and/or detecting torque exerted on the control sticks. The position and torques signals are processed and employed in a feedback loop for each control stick to generate a feedback signal to motors to which the control sticks are mechanically coupled. The motors act on the control stick to simulate the feel of traditional mechanical controllers, and to cause the controllers to track each other's movements.

7 Claims, 2 Drawing Sheets

SERVO COUPLED HAND CONTROLLERS

CROSS-REFERENCE TO RELATED APPLICATIONS

This invention is related to the inventions of copending application Ser. No. 07-87278 and application Ser. No. 07-957427 both concurrently filled herewith.

BACKGROUND OF THE INVENTION

This invention relates to a control system of the type wherein manual control devices such as a control sticks are provided which have an electro-simulated variable rate feel. In particular, the invention relates to a system having two control sticks such as are employed in aircraft, which are servo coupled in a manner coupling the motions as well as the applied forces of the users of the two control sticks.

Servo control technology is well developed as applied for use in the field of robotics. In particular, electrical motor and servo control systems have been developed and employed in the past in the design of robotic hand controllers which are capable of reflecting forces experienced at the robotic end, back to, for example, a human operator.

One example of the type of controller to which the present invention is directed is disclosed in U.S. Pat. No. 4,150,803, which teaches an operator control stick having an electro-simulated Variable rate feel system. The simulated feel system of the device of U.S. Pat. No. 4,150,803 provides the operator with proper force and feel characteristics when used to command a boom employed during refueling operations between aircraft in flight.

The types of controllers to which the invention is directed generally involve the use of a control stick actuatable in at least two mutually perpendicular planes to provide both vertical and lateral control of the device being controlled. This invention could be applied to controllers moveable in three rotational or three translational axes with up to six axes degrees of freedom. A position transducer is associated with the control stick and is used to generate output signals which command a control actuator to effect control of the device being controlled. The output from the transducer is also fed, typically, to at least one servo motor, which is mechanically coupled to an axis of the control stick. The servo motor either applies a resisting force on the control stick or, in response to a signal produced by sensors that detect forces applied to the device or surface being controlled, drives the stick and in turn, drives the device being controlled to alleviate forces generated by the device under control.

These types of controllers are particularly desirable for use in the operation of modern day aircraft, in particular, in the form of the control sticks or yokes. When employed in aircraft for use by pilots, it is desirable to provide two control sticks, one for use by the pilot and the other for use by the co-pilot.

In operation, the devices as used in the cockpit of aircraft are typically designed to exhibit some desired force versus displacement characteristics to the user whereby the magnitude of the control stick displacement is proportional to the force applied. The pilot controller produces as its output an electrical signal corresponding to the control stick position, and the signal is used to control the aircraft, through the action of various motors and mechanical means, in a manner which is well known to those of ordinary skill in the art and is conventional. Thus, with such systems there results and electronically controlled controller having force feel characteristics like those of purely mechanically linked systems. These applications in aircraft are typically referred to as "fly by wire" applications. Examples of presently existing applications of this technology are the systems employed in the Air Bus A320 Transport Aircraft, the General Dynamics F16 Fighter Aircraft and the NASA Space Shuttle.

When employed on aircraft, its is desirable to couple the two control sticks together to insure that they track each other and that only a single set of command signals are provided to the aircraft, for example, to the control surfaces and engines. In the past, aircraft pilot controllers had been coupled between pilot and co-pilot seats by mechanical means such as linkages, shafts, hydraulic devices and other complicated, bulky and weighty mechanisms. Recent efforts to save on the weight of these mechanical coupling systems have provided fly by wire designs which employ no means of coupling the motions of the pilot and co-pilot control sticks. The disadvantage of this approach is that it requires that some means of averaging or arbitrating between differing command signals, in the event that the pilot and co-pilot at the same instant move the controllers in opposite directions. Further, another disadvantage of such a system is that the forces versus displacement characteristics of the controllers are decoupled from the loading on the aircraft control surfaces and from the commands of the auto-pilot.

Accordingly, in the present invention, the disadvantages of having a decoupled pilot and co-pilot control system are avoided without requiring the heavy and bulky mechanical linkages or other such devices employed in the prior art.

SUMMARY OF THE INVENTION

In accordance with one aspect of the invention there is provided a servo-coupled hand control system which includes coupled first and second manual control devices, i.e., control sticks, which are each capable of generating control signals in response to manual input, for example, from movement of the control stick caused by a pilot or a co-pilot. A first one of the manual control devices is a lead controller, for example, as used by a pilot, and the second manual control device is a following control device, for example, as used by the co-pilot. The terms "lead control device" and "following control device" are used for the sake of convenience and understanding, it being understood that the control devices are interchangeable, with the "lead" device being the one then in use to control.

A first position detector is connected to detect the position of the first manual control device and serves to generate a first position signal in response to the position of the first manual control device. A first torque detector also detects any torque exerted on the first manual control device for generating a first torque signal in response to torque exerted on the first manual control device. The first position signal and the first torque signal are summed in a first summing device to generate a first torque error signal. The torque error signal is transmitted to first controller electronics connected to the summing device. The controller electronics performs the function of converting the torque error signal into motor winding excitations. This function can be achieved in many different ways such as with linear amplifiers, six step commutation, sinusoidal commutation, all of which are well known to those of ordinary skill in this art. Such controller electronics are, for example, disclosed in copending application Ser. No. 07-957278 concurrently filed herewith, and incorporated by reference herein, as well as further described in detail as necessary to the understanding of the invention in this specification. The controller electronics serves to control the signals which are fed to a motor to which the first manual control device is connected to produce a feedback desired force versus displacement characteristic for the first manual control device. Desired force displacement characteristics can incorporate parameters such as break-out, force gradients and softstop which are conventional characteristics well known to those of ordinary skill in the art.

Second controller electronics is connected for receiving the output from a second summing device which sums the first torque signal with the second position signal and second torque signal to generate a second torque error signal, which is passed to the second controller electronics. The second controller electronics generates a command signal which is provided to a motor connected to a second manual control device, i.e., control stick, to cause the motor for the second manual control device to force the second manual control device to track in position the movements of the first manual control device.

In a more specific aspect, a mirror arrangement to that of the first manual control device described above is provided for the second manual control device whereby when the second manual control device is moved, the first manual control device is forced to track the movements of the second manual control device.

In yet still another more specific aspect of the invention, the first torque detector is connected to a second summing device of the mirror arrangement discussed, and a second torque detector is connected to the first summing device for having the respective ones of the first and second controller electronics generate command signals to the motor of one of the first and second manual control devices. These command signals are representative of the torque being exerted on the other one of the first and second manual control devices and of the position thereof, whereby the pilot and the co-pilot can feel each others' influence on the control of the aircraft.

In yet still another aspect, the invention provides the capability for the first and second manual control devices to receive a center position command signal from the control system of vehicle on which it is employed, i.e., an aircraft autopilot system, or resulting from forces exerted on the flight control surfaces, that is summed to the position and torque signals such that the position of the manual control devices will move in a direction and magnitude indicative of the control of the, i.e, aircraft autopilot system or forces applied to the control surfaces, when the center position signal is added.

BRIEF DESCRIPTION OF THE DRAWINGS

Having thus briefly described the invention, the same will become better understood when described in detail with reference to the attached drawings wherein.

DETAILED DISCUSSION OF THE INVENTION

Figure 1:
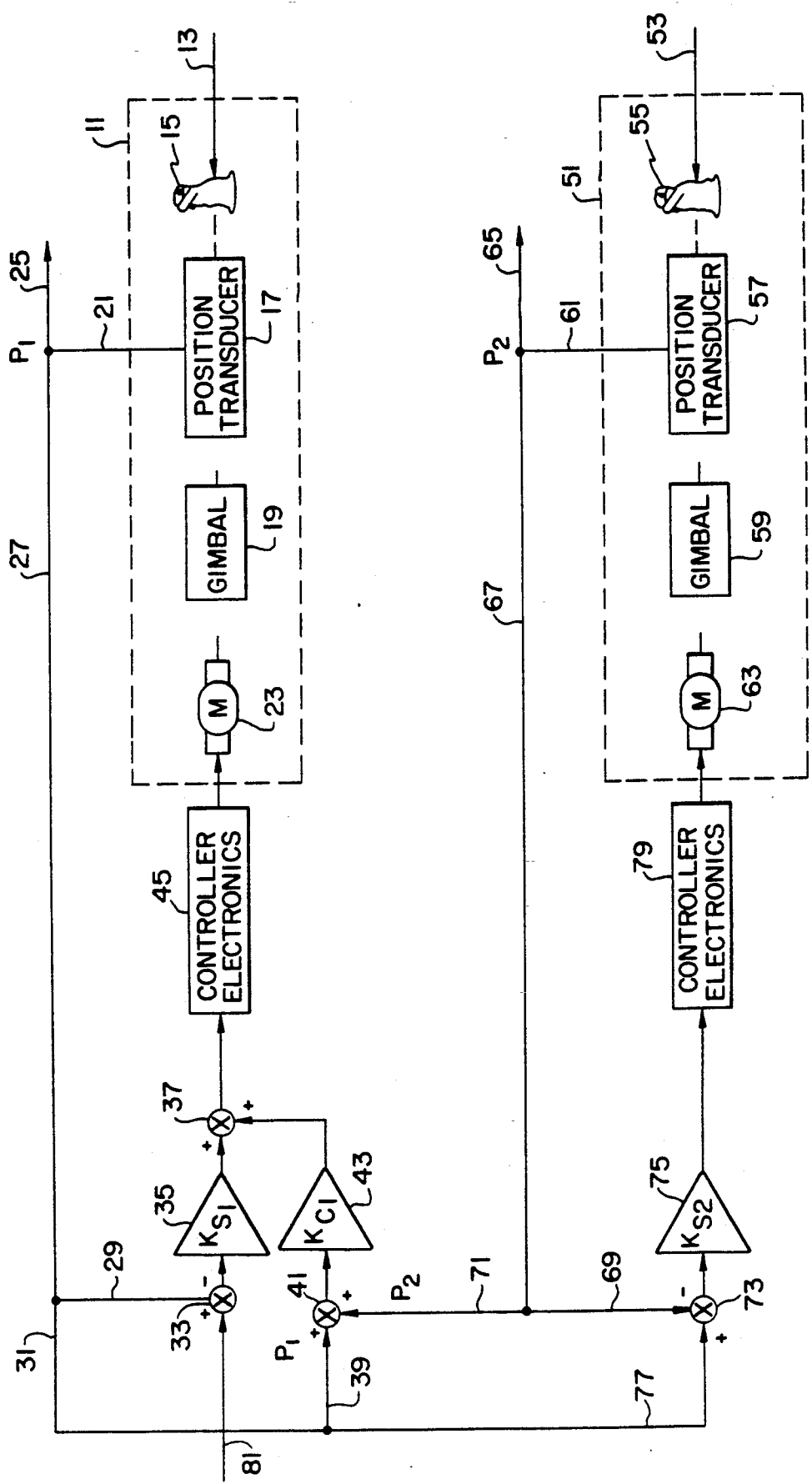
FIG. 1 is a schematic diagram of a servo-coupled system having two manual control devices employing principles of the present invention, wherein the respective positions of the manual control devices can be detected, and feedback is provided between the two manual control devices to insure that the two control devices track each other in movement.

The system of FIG. 1 discloses one arrangement for electronically coupling the motions as well as applied forces, for example, of pilot and co-pilot manual control devices, i.e., control sticks. FIG. 1 is a simplified block diagram of a single axis, i.e. pitch, roll or yaw, servo-coupled dual active pilot controller system wherein the coupling is achieved by employing hand grip position signals generated by movement of control sticks. In FIG. 1, as in FIG. 2, the hand grip of each control stick is shown directly coupled through a gimbal to a motor, this coupling being a conventional arrangement well known to those of ordinary skill in the art. In practice in such devices, a gear head is typically used between the motor and the control stick having the hand grip. Thus, of the sake of simplicity in illustration, the basic system of the invention is described with reference to only a one axis system. It will be recognized by those of ordinary skill in the art that the basic servo loop described herein, as shown with a single motor, can be multiplied to provide the necessary redundancy and multiple axis control these systems require.

In FIG. 1 a first manual control device 11 has a control stick 15 with a hand grip and with a shaft position transducer 17 connected to the control stick 15 to generate signals indicative of the position of the control stick 15. The control stick 15, like in the case of control stick 55 of the bottom half of FIG. 1, is connected through an appropriate gimbal 19 interposed between the control stick 15 and a motor 23. A position detecting transducer 17 is typically employed to detect the position of the control stick 15 which is moved by application of a manual input 13, i.e., a force. Alternatives to the transducer can include digital sensors, for example, optical encoders, electromagnetic pick-off, or other equivalent devices which can be substituted therefor as will be readily apparent to those of ordinary skill in the art.

As the control stick 15 is moved, the position detecting transducer 17 generates a signal which is a position signal P1 which is transmitted through line 21 in part, to a position command output for control, for example, of aircraft control surfaces through line 25, and through line 27 in part, through first line 29 wherein it is subtracted from a center position command signal input from line 81, if present, at a signal summing device 33.

The center position command signal input at line 81 can be, for example, from an autopilot system or a signal supplied which is representative of forces acting on flight control surfaces, which by providing a signal through line 81 serves to have the control stick 15 track by movement in a manner responsive to an autopilot system or forces acting on flight control surfaces. If the center position command signal is not present, i.e., the autopilot is not activated or no forces are acting on the flight control surfaces, then the only signal passed through signal summing device 33 is the position signal P1. In any event, this summed signal is passed through an amplifier 35, illustrated as KS1, from which the amplified position signal is then passed through another summing device 37 to produce a torque error signal which is passed to controller electronics 45. The controller electronics 45 is conventional and well known to those of ordinary skilled in the art of control systems, and serves to process input, including feedback signals, to produce motor winding excitations which are proportional to the position of the control stick 15. The motor winding excitations are passed to the motor 23 to cause the motor to operate to generate a resisting torque on the handle 15 which is similar to the action of a spring loaded mechanical device as has been employed in the prior art involving mechanically centered control sticks. The simulated spring rate generated is dependent upon the gain of amplifier 35, which may be selected in a manner well known to those of ordinary skill in the art to emulate mechanically spring loaded systems.

The shaft position signal P1 is also passed through lines 31 and 39 to summing device 41 in which it is summed with the shaft position signal P2 from the second control stick 55, which in this case is generated in a manner similar to that of control stick 15.

As illustrated in the bottom portion of FIG. 1, the control stick 55 handle operates in combination with a position detecting transducer 57, gimbal 59 and motor 63, in a manner similar to that of the first control stick 15 to generate a position signal P2 through line 61 which is transmitted to a second position command output line 65 similar to the first position command output.

The second position signal P2 is also transmitted through lines 67 and 71 to the summing device 41. In the summing device 41 the position signal PI from the control stick 15 which is passed thereto through lines 31 and 39 is summed with the position signal from control stick 55. This results in an error signal which is amplified by amplifier 43, shown as gain block KC1, and is amplified greatly to produce a much stronger restoring torque signal than that produced by amplifier 35, i.e., gain block KS1. The two signals amplified by amplifiers 35 and 43 are then added together by summing device 37 and transmitted to the controller electronics 45 for processing to result in a motor torque command for motor 23. The processing, as previously noted, is conducted in a manner which is conventional and well known to those of ordinary skill in the art. More specifically, the error signal from amplifier 43 serves, after processing, to provide a signal which drives the motor 23 to generate a torque through gimbal 19 to force the control stick 15 to move and become aligned in position with the position of control stick 55 when control stick 55 has a force 53 exerted thereon, for example, by a copilot. The gain of the amplifier 43 is thus selected, relative to amplifier 35, to be such that any forces exerted on control stick 55 are reflected, in a simulated manner, to the user at control stick 15.

Turning now to the lower half of FIG. 1, a position signal P2 which is generated by control stick 55 in response to a manual input 53, i.e., a force exerted, through position detecting transducer 57, is transmitted in a manner similar to that of position signal P1. More specifically, position signal P2 is transmitted through line 67 and line 69 to be subtracted at summing device 73 from the position signal P1 which has been transmitted to summing device 73 through line 77. This operation yields an error signal which is transmitted to amplifier 75, i.e., gain block KS2, wherein it is amplified and then transmitted to the controller 79 for processing. The signal from amplifier 75 is processed by controller 79 to generate a signal which causes the motor 63 to generate a torque through gimbal 59 which moves the control stick 55 in alignment with the control stick 15 as control stick 15 has been moved by application of a force 13 thereon. Thus, the system of FIG. 1 provides for servo-coupling between the two pilot controllers through the use of position signals.

As may be appreciated from the above description of the embodiment of FIG. 1, either one of control stick 15 and 55 of the respective controller may be moved manually from a center rest position by the application of force on its handgrip. The control stick selected for movement by a crew member thus becomes the leading control stick.

As also represented in FIG. 1, and previously discussed, a center position command signal may be input at line 81 to a summing device 33 and summed with the position feedback signal P1, and amplified by amplifier 35, i.e., KS1. Such a center position command signal can be, for example, from an autopilot mechanism or result from forces exerted on flight control surfaces. If the center command signal is present at line 81, it is summed, i.e., position signal P1 is subtracted therefrom at summing device 33, and the summed and amplified signal is passed through the controller electronics 45 causing the control stick 15 to move in a manner corresponding to the magnitude and polarity output. This movement causes a change in the signal P1 to be generated. The position coupling of the first control stick 15 to the center position command signal at line 81 is passed through the summing junction 73 through position signal P1 and line 77 to cause the second control stick 55 to also move in accordance to the magnitude and polarity of the center position command signal from line 81. The frequency response of the control electronics 45 and 79, and the dynamics of motors 23 and 63 and gimbals 19 and 59 are preferably high enough to prevent noticeable lag between the movement of the first control stick 15 and the second control stick 55.

An alternative embodiment of the system in accordance with the invention is now disclosed and discussed with reference to FIG. 2. As in the case with the system of FIG. 1, in the system of FIG. 2, the shaft position signals P1 and P2 are generated by the respective control sticks 15 and 55 to produce a similar simulated spring centered response as in the case with FIG. 1. Specifically, in the case of the upper half of the system, position signal P1 is fed through lines 21 and 27 to summing device 33 wherein it is subtracted from a center position command signal from lines 81 and 83, if applicable, resulting in a signal which is then amplified by amplifier 35. A similar arrangement is seen with respect to position signal P2 which is fed through lines 61 and 67 to summing device 73 wherein it is subtracted from the center position command signal, if applicable, transmitted thereto through line 85. The resultant signal is then amplified by amplifier 75 to be fed back to its control stick.

If a center position command signal originating at line 81 is applied to summing devices 33 and 73, it is passed through to the controller electronics 45 and 79 to thereby drive the motors 23 and 63 to position their respective control sticks 15 and 55 in correspondence to the center position command signal, e.g., autopilot control. In this manner, both control sticks 15 and 55 are moved simultaneously in response to the center position command signal.

Figure 2:
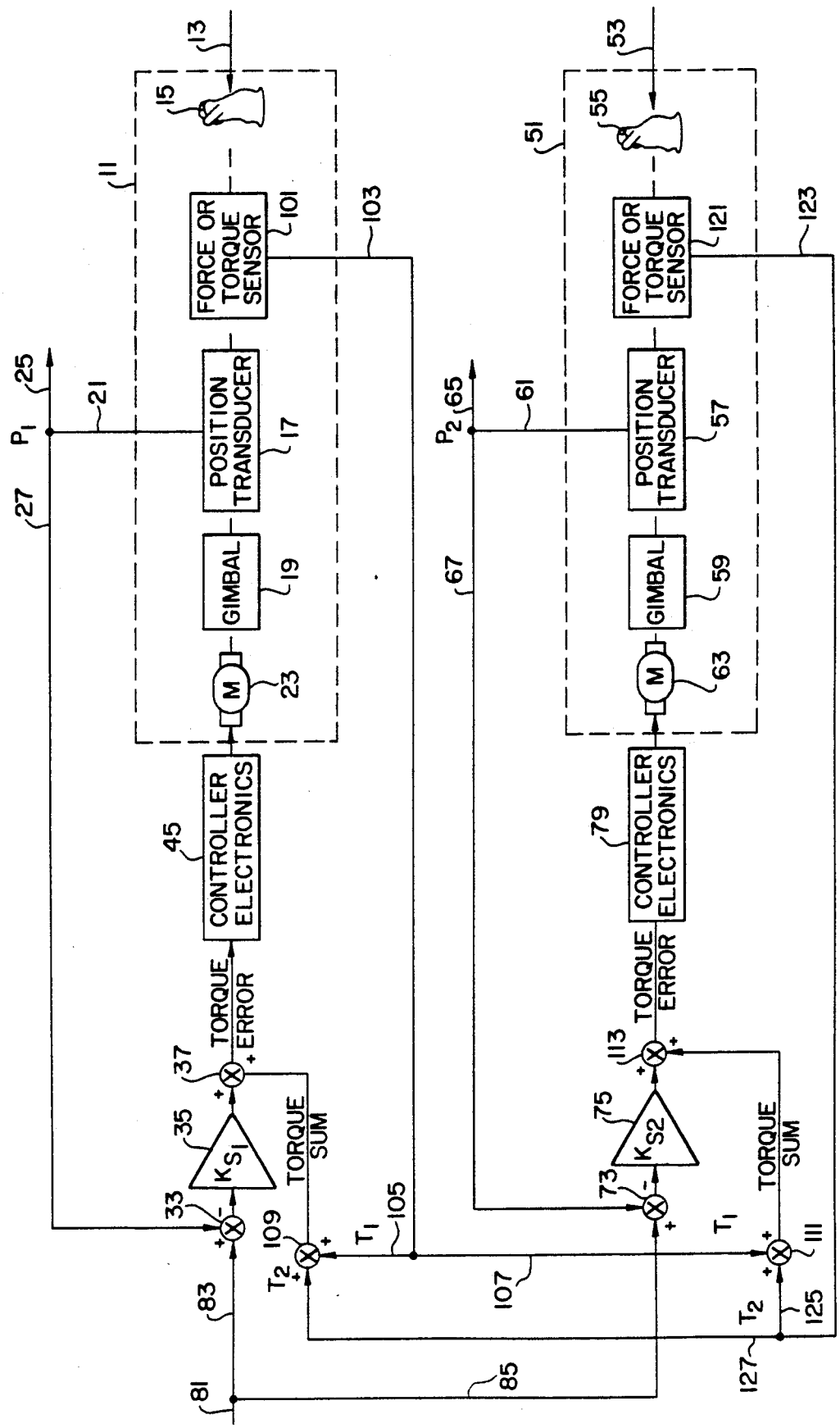
FIG. 2 is a schematic diagram as in FIG. 1 showing an alternative circuit employed in the system of the present invention, providing for both detection of position and detection of torque, to be employed in combination, to provide a servo-coupled system for the two manual control devices.

In the system of FIG. 2, with or without a center position command signal, coupling between the two control sticks 15 and 55 is produced by additionally summing torque signals detected at each control stick 15 and 55. The torque signals for each of the control sticks 15 and 55 are generated by the force or torque sensors 101 and 121 associated respectively with each, through lines 103 and 123 respectively. For control stick 15, the torque signal indicative of torque measured at the control stick 15 is summed at summing device 37 with amplified position signal P1, after summing, if applicable, with a torque signal from control stick 55 which has previously been summed therewith at summing device 109. The signal representative of the torque at control stick 15 is passed to summing device 109 through line 103 and through line 105 to be summed with the torque signal for torque measured for control stick 55 which is passed through lines 123 and 127 to be summed at summing device 109. The summed signal is then passed to summing device 37 to be summed with the position signal output of amplifier 35 to result in a torque error signal which is then processed by controller electronics 45.

In the controller electronics 45, the summed signal which is a torque error signal is operated on to produce a motor command signal for motor 23 which is transmitted through gimbal 19 to control stick 15 to reflect either input from a center command signal, control stick 55 or neither, in which case position and torque feedback from control stick 15 is passed to generate a spring centered response as disclosed in the system of copending application Ser. No. 07-957278 matter number incorporated by reference herein.

As may be appreciated, in the embodiment of FIG. 2 the torque signal is used to couple the control sticks 15 and 55, thus resulting in more accurate tracking and force feel characteristics reflected between the control sticks 15 and 55. Thus, it will also be appreciated that during operator movement of, for example, the control stick 15, a position signal P1 of the control stick 15 is used to create a desired force versus displacement characteristic dependent upon the gain of amplifier 35, i.e., gain block KS1. The torque signal being transmitted from control stick 15 through lines 103 and 107 through summing junctions 111 and 113 to the controller of control stick 55 is initially unopposed by any torque measured and transmitted through lines 123. This unopposed torque signal from the control stick 15 is then passed into the controller electronics 79 of control stick 55 to produce a motor command signal which cause the motor 63 to move the control stick 55 through gimbal 59 in a manner which tracks the position of leading control stick 15. This is done by processing the torque signal fed to the controller electronics 79 in a conventional manner to result in a motor command which balances the torque and position feedback from control stick 55 to achieve zero torque error.

If a second operator applies a torque to control stick 55, both the position of and torque on the control sticks 15 and 55 are measured and corresponding signals generated. The position signal P2 is passed through lines 61 and 67 to summing device 73 wherein it is subtracted from a center position command signal, if applicable, from lines 81 and 85 and the result is then amplified by amplifier 75. The torque signal generated by torque sensor 121 is passed through lines 123 and 125 to be added together with the torque signal from torque sensor 101, at summing device 111. The result of this addition is thereafter added to the amplified output of amplifier 75 and the sum is then passed into the controller electronics 79.

The measured torque signal from control stick 55 is also transmitted from line 123 through line 127 through the controller electronics 45 as combined with the other detected signals, to control stick 15 as was previously described. Thus, it will be appreciated that in the event a resisting torque is applied by a second operator to the hand grip of control stick 55, the resultant torque signal affects the torque error entering the controller electronics 45 of the control stick 15. The controller electronics 45 of the control stick 15 will adjust the motor command to motor 23 to apply the force to the hand grip of control stick 15 to cause the operator of the control stick 15 to feel the torque exerted by the operator of the control stick 55. The controller electronics 45 and 79 are designated such that the control sticks 15 and 55 always remain position coupled under all conditions of mutually applied torque up to a maximum of the torque capacity of the motors. The frequency response of the controller electronics 45 and 79, and the dynamics of motors 23 and 63 and gimbals 19 and 59 are selected to be high enough to prevent noticeable lag between the position of the first and second control sticks 15 and 55.

With respect to a center control signal passed, for example, from an autopilot through line 81, the signal in this embodiment is passed directly through lines 83 and 85 respectively, to the summing devices 33 and 111. Thus, the effect of such signal is to have the control sticks 15 and 55 track in accordance with the e.g., autopilot operation. This embodiment differs from that of FIG. 1 in that the center command signal is reflected by direct connection to each controller electronics 45 and 79 as opposed to the indirect effect of FIG. 1 at position signal P1 to be passed to the second control stick 55.

Having thus described the invention the details provide herein are intended for the ease of understanding only and are not to be construed in a limiting manner. The scope of the invention will become better understood from the appended claims.

What is claimed is:

1. A servo coupled hand control system comprising:
    coupled first manual control means and second manual control means for generating control signals in response to respective manual inputs, said first manual control means being a leading control means and said second manual control means being a following control means;
    first position detecting means for detecting the position of said first manual control means and for generating a first position signal in response thereto;
    first torque detecting means for detecting torque exerted on said first manual control means and for generating a first torque signal representative of said torque exerted on said first manual control means in response thereto;
    first summing means for summing said first position signal and said first torque signal for generating a first torque error signal;
    first controller electronics means for processing said first torque error signal to generate a command signal for said first manual control means to produce a predetermined force versus displacement characteristic for said first manual control means; and second controller electronics means for receiving and processing said first torque signal from said first torque detecting means for generating a command signal for causing said second manual control means to track in position said first manual control means.

2. A system as in claim 1 further comprising center command signal input means connected to said first summing means for having a non-manually generated signal passed to said first summing means to be summed therein with said manually generated signals for having the effects of said non-manually generated signal reflected in the tracking in position of said first manual control means.

3. A system as in claim 1 wherein said first and said second manual control means comprise respectively, a control stick connected through a gimbal to a motor.

4. A servo coupled hand control system comprising:
coupled first manual control means and second manual control means for generating control signals in response to respective manual inputs, said first manual control means being a leading control means and said second manual control means being a following control means;

first position detecting means for detecting the position of said first manual control means and for generating a first position signal in response thereto;

first torque detecting means for detecting torque exerted on said first manual control and for generating a first torque signal in response thereto;

first summing means for summing said first position signal and said first torque signal for generating a first torque error signal;

first controller electronics means for processing said first torque error signal to generate a command signal for said first manual control means to produce a predetermined force versus displacement characteristic for said first manual control means;

second controller electronics means for receiving and processing said first torque signal from said first torque detecting means for generating a command signal for causing said second manual control means to track in position said first manual control means;

second position detecting means for detecting the position of said second manual control means and for generating a second position signal in response thereto;

second torque detecting means for detecting torque exerted on said second manual control means and for generating a second torque signal representative of said torque exerted on said second manual control means in response thereto;

second summing means for summing said second position signal and said second torque signal, to generate a second torque error signal, and for supplying said second torque error signal to said second controller electronics means;

said second controller electronics means being further connected for receiving and processing said second torque error signal from said second summing means to generate a command signal for said second manual control means to produce a predetermined force versus displacement characteristic for said second manual control means; and said first controller electronics means further connected for receiving and processing said second torque error signal from said second summing for generating a command signal for causing said first manual control means to track in position said second manual control means.

5. A system as in claim 4 wherein said first torque detecting means is connected to said second summing means and said second torque detecting means is connected to said first summing means for having said respective first and second processing means generate a command signal to one of said first and second manual control means representative of torque being exerted on the other of said first and second manual control means.

6. A system as in claim 4 further comprising center command input means connected to said first summing means and to said second summing means for having a non-manually generated signal passed to said first summing means and to said second summing means to be summed respectively therein with said manually generated signals for having the effects of said non-manually generated signals reflected in the tracking in position of said first manual control means and said second manual control means respectively.

7. A system as in claim 4 wherein said first and said second manual control means each comprise respectively, a control stick connected through a gimbal to a motor.

* * * * *